C. F. ALLEN.

CORSET.

No. 10,019. Reissued Jan. 31, 1882.

Attest:
Courtney A. Cooper
A. E. Lansmann.

C. F. Allen
By his attorney
Charles E. Foster

UNITED STATES PATENT OFFICE.

CHAUNCEY F. ALLEN, OF WATERBURY, CONNECTICUT.

CORSET.

SPECIFICATION forming part of Reissued Letters Patent No. 10,019, dated January 31, 1882.

Original No. 230,163, dated July 20, 1880. Application for reissue filed January 3, 1882.

*To all whom it may concern:*

Be it known that I, CHAUNCEY F. ALLEN, of Waterbury, in the county of New Haven and State of Connecticut, have invented certain new and useful Improvements in Corsets; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention is a corset constructed, as fully described hereinafter, for the purpose of securing a proper fit, and a stiff yet yielding support for the corset at the sides between the arms and the waist.

Figure 1:
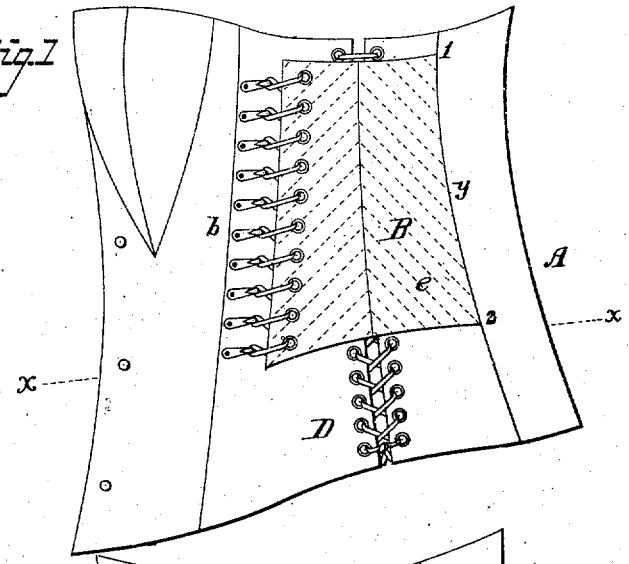
Figure 4:
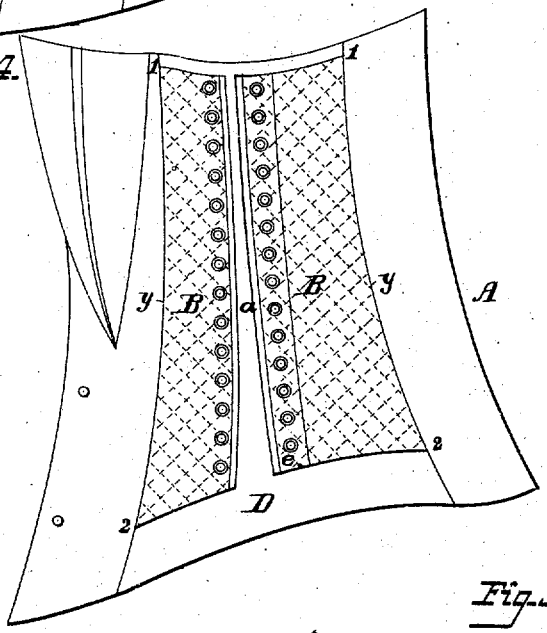
Figure 2:
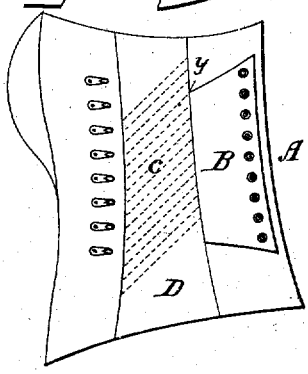
Figure 3:
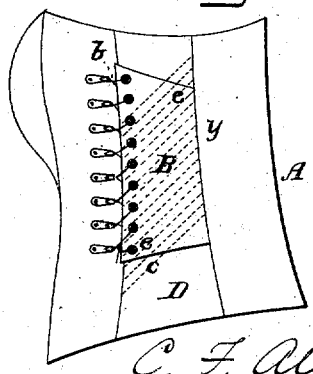

In the drawings forming a part of this specification, Figure 1 is a view showing one side of my corset. Fig. 2 is a modification showing the body stiffened and the overlying section thrown open. Fig. 3 is the same, showing the section lying down upon the body. Fig. 4 is another modification, showing the overlying section in two pieces, secured at the outer edges to the body and at the center to each other.

The body portion A of the corset, as shown, is of any of the usual forms, constructed in the ordinary manner, the lacing being at the back or at the sides, as in Fig. 1. Instead, however, of stiffening or boning the side portion, D, of the corset I propose in some cases, as in Figs. 1 and 4, to leave the same unboned and perfectly flexible. To the sides above the hip portion, terminating, say, at the line *x*, I apply one or more overlying sections, B, stiffened in any suitable manner by quilting, or by grass fabric, or by bones, or cords, suitably arranged. Each wing is secured to the corset at the opposite edges. In Fig. 4, where the wing is in two sections, the edge attachment is permanent, the sections being connected adjustably by lacing at the center; but in Figs. 1, 2, and 3 the attachment at one edge, *y*, is fixed by sewing, eyelets, or otherwise, in any suitable manner, and the other edge is connected by a lace, *b*, to hooks on the body. The overlying sections, thus secured and arranged at the sides between the arm and hip, impart the desired stiffness to this portion of the corset, yet insure such flexibility that the corset will bend and accommodate itself to the movements of the wearer without breaking the stiffeners either in the sides of the corset or the overlying portions. Such stiffeners may be arranged in the side portion, as shown in Figs. 2 and 3, showing diagonal cording *c*, the under side section being re-enforced and stiffened by the overlying section, which imparts the proper rigidity and prevents the corset from creeping up, without rendering it so unyielding as to abrade the body of the wearer. In some instances, where the overlying section is in two parts, they may extend to the lower edge, the lacing between them permitting sufficient flexibility over the hip.

By the use of adjustable fastenings, as described, either at the sides of the body, or for connecting the edges of the overlying sections, the corset may be made to fit exactly to the body.

In most instances great advantage will result from using a lacing of rubber or other elastic material, covered by braiding with cotton or silk. This secures the parts together while preventing binding and strictures.

Without limiting myself to the precise construction and mode of attaching and tightening the wings shown, I claim—

1. A corset provided between the arm and the hip with a stiffened section overlying the body portion and secured thereto at the edges, substantially as set forth.

2. A corset provided with one or more stiffened wings, each attached externally to the body at one edge, overlapping the body and extending between the arm and the hip, and provided at the opposite edge with lacing or other fastening, substantially as set forth.

3. The combination, in a corset, of the overlying stiffened side sections and the sides stiffened beneath said sections, substantially as set forth.

In testimony whereof I affix my signature in presence of two witnesses.

CHAUNCEY F. ALLEN.

Witnesses:

CHARLES E. FOSTER,
A. E. T. HANSMANN.